United States Patent [19]
Pöllmann et al.

[11] 3,819,988
[45] June 25, 1974

[54] DEVICE FOR MOUNTING ELECTRICAL EQUIPMENT INCLUDING A SNAP FASTENING CONDUCTOR MOUNTING PLATE

[75] Inventors: Fritz Pöllmann; Edgar Wiessner, both of Amberg, Germany

[73] Assignee: Siemens Aktiengesellschaft, Munchen, Germany

[22] Filed: Feb. 22, 1973

[21] Appl. No.: 334,930

[30] Foreign Application Priority Data
Feb. 25, 1972 Germany............................ 2208929

[52] U.S. Cl.................................. 317/99, 317/122
[51] Int. Cl. .............................................. H02b 1/20
[58] Field of Search ............ 317/99, 119, 120, 122; 174/72 A

[56] References Cited
UNITED STATES PATENTS
2,140,376   12/1938   Anderson............................ 317/122
3,740,614   6/1973   Baso ..................................... 317/99

Primary Examiner—Robert K. Schaefer
Assistant Examiner—Gerald P. Tolin
Attorney, Agent, or Firm—Kenyon & Kenyon Reilly Carr & Chapin

[57] ABSTRACT

A device for mounting electrical equipment wired with electrical conductors is disclosed. The device has a base plate to which is fastened a support unit. Comb-like plates are disposed at the bottom side of the support unit and each has a plurality of notches for accommodating the electrical conductors therein. The support unit has a plurality of openings formed therein and snap-fastening extensions on each comb-like plate engage the support unit at the openings thereof.

6 Claims, 4 Drawing Figures

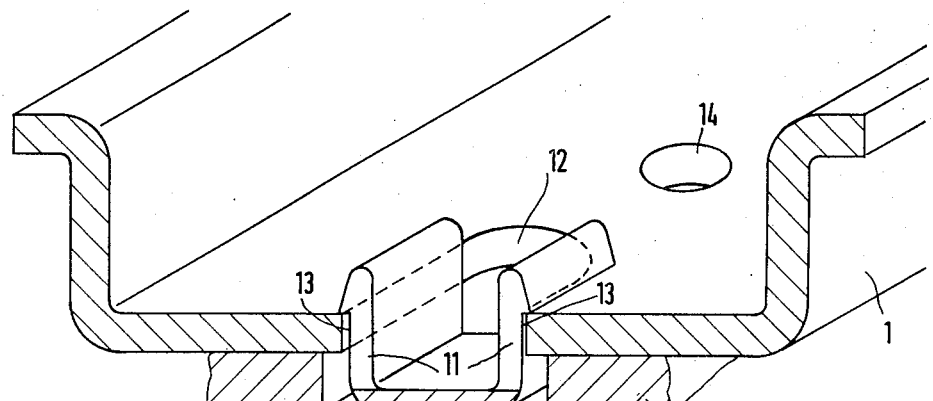
Fig.2
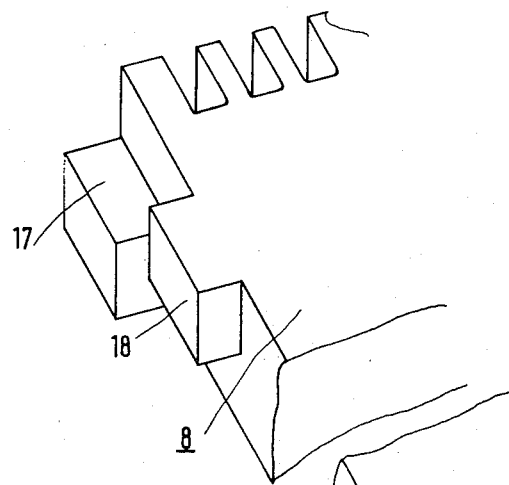
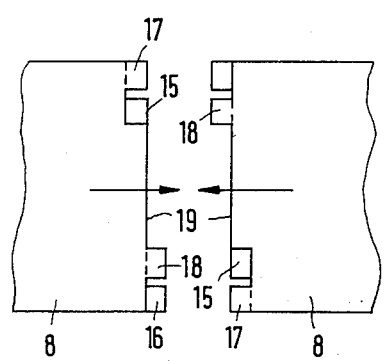
Fig.4  Fig.3

DEVICE FOR MOUNTING ELECTRICAL EQUIPMENT INCLUDING A SNAP FASTENING CONDUCTOR MOUNTING PLATE

BACKGROUND OF THE INVENTION

The invention relates to a device for mounting electrical equipment. For mounting the equipment the device includes an equipment support unit and sockets for fastening the unit to a base plate. The conductors to be connected to the equipment are held in the comb notches of comb-like plates which rest against the bottom side of the equipment support unit.

Deutsche Offenlegungsschrift No. 1,800,491 discloses an arrangement of the kind mentioned above. Here the equipment support unit is configured as a mounting bar underneath which a comb-like bar is arranged. The comb-like bar must be made of plastic material, preferably soft plastic, to ensure that the conductors can be snapped-in in a simple manner. Because the comb-like bar is made of plastic, it becomes bent for relatively large clamping lengths between the clamping points. The comb-like bar is pressed against the mounting bar only by means of the sockets so that the conductors can be inserted only with difficulty. Also, the bending of the comb-like bars is undesirable for aesthetic reasons.

SUMMARY OF THE INVENTION

Accordingly, it is an object of the invention to establish a simple and reliable connection between the equipment support unit and the comb-like plates. This object is achieved in a device of the kind discussed above by providing the comb-like plates with barb-like extensions which can snap into cutouts in the equipment support unit.

The device of the invention for mounting electrical equipment wired with electrical conductors includes as a feature a base plate, an equipment support unit, and fastening means for fastening the support unit to the base plate. A plurality of comb-like plates are disposed at the bottom side of the support unit and have a plurality of notches for accommodating the electrical conductors therein. The support unit has a plurality of openings formed therein and snap-fastening holding means on each of the comb-like plates are provided for engaging the support unit at the openings thereof.

According to a subsidiary feature of the invention, the snap-fastening holding means can be barbed extensions on each of the comb-like plates for snapping into the openings to hold the comb-like plates to the support unit so as to rest against the bottom side of the support unit.

Certain longitudinal tolerances of the equipment support unit and the comb-like plate can be compensated in a simple manner if the cutouts in the equipment support unit are elongated holes which extend in the longitudinal direction of the equipment support unit. A relatively accurate lateral adjustment between the position of the comb notches and the equipment itself is obtained if two extensions are provided for each cutout which can be placed at two mutually parallel lateral edges of a cutout. Thus, the equipment support unit can have a longitudinal axis and the openings in the support units can be slots extending in the direction of the axis and each of the slots has mutually parallel side edges extending in the direction of the axis. The number of the barbed extensions can be selected to provide two of the extensions for each one of the slots in the support unit wherein the extensions rest against corresponding ones of the side edges of these slots. A means for fastening the extensions is not needed, for example, when the extensions are formed on the comb-like plate.

Although the invention is illustrated and described herein as a device for mounting electrical equipment, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 2 is a cross-section taken at a location where there is a connection between the equipment support unit and the comb-like plates.

FIG. 3 is a perspective view of the arrangement of cutouts and projections at the comb-like plate.

FIG. 4 shows mutually adjacent end faces of two comb-like plates in a plan view.

DESCRIPTION OF THE PREFERRED EMBODIMENTS OF THE INVENTION

Figure 1:
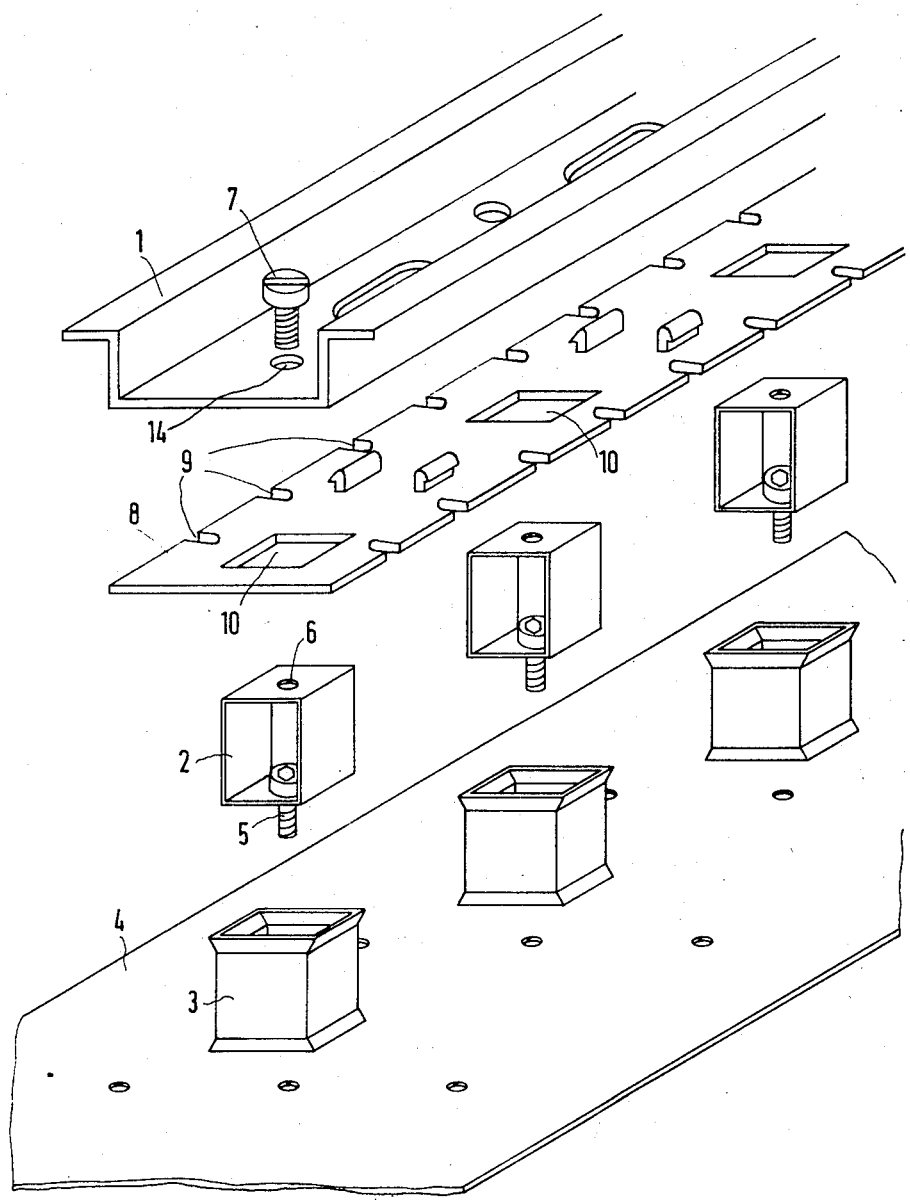
FIG. 1 is an exploded view of the device according to the invention.

The equipment support unit 1 has a section profile corresponding to a section taken through an inverted hat. The support unit 1 is fastened at the base plate 4 by means of screws 5 via a spacer 2 over which an insulating sleeve 3 is pushed. On the side of the spacer 2 facing away from the base plate there is a tapped hole 6 into which a fastening screw 7 is screwed which serves to connect the spacer with the hat profile section. The comb plate 8 arranged on the bottom side of the hat profile section 1 has comb notches 9 for holding the conductors (not specifically shown) and cutouts 10 which fit the external shape of the spacers 2, so that the spacers 2 rest directly against the hat profile section 1. It is therefore not necessary to make a clamping connection via plastic. Barb-shaped extensions 11 at the comb plate 8 serve to fasten the comb plate 8 to the hat profile section 1; these extensions snap into the cutouts 12 of the hat profile section 1, the cutouts 12 being in the form of elongated holes. The extensions 11 are formed at the comb plate 8 and are configured so that they rest against two mutually adjacent lateral edges 13 of the elongated hole 12. Because the extensions 11 do not fill the rounded part of the elongated hole, a slight displacement of the hat profile section with respect to the comb plate 8 is possible so that the through holes 14 for the fastening screw 7 can be positioned in a manner which takes into account the cutout 10. Because the barbs pass through the bottom of the hat profile section, they occupy otherwise unused space.

FIGS. 3 and 4 show the configuration of the comb plates with the recesses 15 and 16 as well as the projections 17 and 18 at the end face 19 of the comb plate 8. The projections and the recesses have a square shape in the illustrated embodiment; this is advantageous when applying molding techniques. In FIG. 4 the two end faces 19 of mutually adjacent comb plates 8 face each other and the projections 17 can be inserted into the recesses 16 and the projections 18 into the recesses 15. The engagement of the projections and recesses at the end faces of the comb plates has the advantage that the comb plates are also secured against bending between two barb-shaped extensions 11. As disclosed above, the extensions 11 snap into cutouts 12 at the equipment support unit 1.

Aside from the improved appearance, the device according to the invention is also easier to assemble because the comb plates and the hat profile sections can be put together already prior to the completion of the unit.

What is claimed is:

1. A device for mounting electrical equipment wired with electrical conductors comprising a base plate, an equipment support unit, fastening means for fastening said support unit to said base plate, a plurality of comb-like plates disposed at the bottom side of said support unit and having a plurality of notches for accommodating the electrical conductors therein, said support unit having a plurality of openings formed therein, and snap-fastening holding means comprising barbed extensions on each of said comb-like plates for snapping into said openings to hold said comb-like plates to said support unit so as to rest against said bottom side thereof.

2. The device of claim 1 said extensions being formed on said comb-like plates and being integral therewith.

3. The device of claim 1, said equipment support unit having a longitudinal axis, said openings formed in said support units being slots extending in the direction of said axis.

4. The device of claim 3, each of said slots having mutually parallel side edges extending in the direction of said axis, the number of said barbed extensions being selected to provide two of said extensions for each one of said openings wherein said extensions rest against corresponding ones of said side edges.

5. The device of claim 1, said comb-like plates being disposed one behind the other in the direction of said longitudinal axis of said support unit, each two mutually adjacent comb-like plates having respective end portions also mutually adjacent, one of said end portions having recesses formed therein extending in the direction of said axis, the other one of said end portions having projections formed thereon to match and engage corresponding ones of said recesses thereby joining each two mutually adjacent ones of said comb-like plates together.

6. The device of claim 1, said comb-like plates being disposed one behind the other in the direction of said longitudinal axis of said support unit, each two mutually adjacent comb-like plates having respective end portions also mutually adjacent, each of said end portions having recesses formed therein and projections formed thereon, said recesses and said projections all extending in the direction of said axis, the recesses and projections of one of said end portions matching and engaging corresponding ones of said projections and recesses on the other one of said end portions thereby joining each two mutually adjacent ones of said comb-like plates together.

* * * * *